US008643650B1

(12) United States Patent
Vinchon et al.

(10) Patent No.: US 8,643,650 B1
(45) Date of Patent: Feb. 4, 2014

(54) SYSTEM AND METHOD FOR APPROXIMATING PARAMETRIC CURVES USING OPTIMAL NUMBER OF SEGMENTS

(75) Inventors: Eric Vinchon, Lyons (FR); Vincent Varennes, Lyons (FR); Philippe Cohen, Lyons (FR)

(73) Assignee: Adobe Systems Incorporated, San Jose, CA (US)

( * ) Notice: Subject to any disclaimer, the term of this patent is extended or adjusted under 35 U.S.C. 154(b) by 1181 days.

(21) Appl. No.: 12/541,090

(22) Filed: Aug. 13, 2009

(51) Int. Cl.
*G06T 11/20* (2006.01)

(52) U.S. Cl.
USPC .......................... 345/442; 345/423; 345/441

(58) Field of Classification Search
None
See application file for complete search history.

(56) References Cited

U.S. PATENT DOCUMENTS

| | | | |
|---|---|---|---|
| 4,774,685 A | 9/1988 | Samuels | |
| 5,367,617 A | 11/1994 | Goossen et al. | |
| 5,408,598 A * | 4/1995 | Pryor, Jr. ........................ | 345/442 |
| 5,500,927 A | 3/1996 | Sander-Cederlof et al. | |
| 5,818,459 A | 10/1998 | Kurumida | |
| 2003/0034970 A1 * | 2/2003 | Hubeli et al. ................. | 345/420 |
| 2004/0122549 A1 | 6/2004 | Otsuki et al. | |
| 2006/0256115 A1 | 11/2006 | Cao et al. | |

OTHER PUBLICATIONS

Luiz Velho, et al., "A Unified Approach for Hierarchical Adaptive Tesselation of Surfaces", ACM Transactions on Graphics, vol. 18, No. 4, Oct. 1999, pp. 329-360.

* cited by examiner

*Primary Examiner* — Jwalant Amin
(74) *Attorney, Agent, or Firm* — Kilpatrick Townsend & Stockton LLP

(57) ABSTRACT

A system and method for approximating parametric curves may subdivide curves using a minimum number of subdivisions while meeting a given error tolerance. The method may include determining a subdivision point such that the maximum chord error on one side of the point is equal to the maximum chord error on the other side of the point, the chord error being the distance between the curve and a linear approximation thereof. These techniques may be applied recursively to sub-portions defined by the subdivision point if the maximum error is greater than a pre-determined error tolerance. The pre-determined error tolerance may be a default tolerance, or may be application-specific or user-configurable, in various embodiments. By subdividing a curve into fewer segments than conventional methods, the system and methods described herein may allow an alternate representation of the curve to be generated that includes less data than one generated using conventional methods.

18 Claims, 7 Drawing Sheets

SYSTEM AND METHOD FOR APPROXIMATING PARAMETRIC CURVES USING OPTIMAL NUMBER OF SEGMENTS

BACKGROUND

Description of the Related Art

In computer graphics, high-level curve approximations are often used to display curves. In some cases, such approximations may be necessary, because graphics pipelines for rendering 3D objects on currently available graphics hardware typically can only deal with image objects represented by a collection of line segments. In such cases, subdivision algorithms are often applied to parametric curve representations of 3D objects because they can generate a 3D object representation in which the level of detail (and thus the complexity) of the 3D object is decreased as its distance from the viewer is increased. Such representations can be refined (e.g., adding back in additional detail and complexity) when zooming in.

Algorithms to approximate curves with segments exist in various graphics application products (e.g., Acrobat 3D). These algorithms typically include one of several conventional methods for subdividing parametric curves and/or generate level of detail (LOD) representations of 3D objects. One conventional technique subdivides parametric curves recursively at their middle parameter (i.e. at the midpoint of the curve and of each portion of the curve as it is recursively subdivided). As described in "A Unified Approach for Hierarchical Adaptive Tesselation of Surfaces", Luiz Velho, et al. (ACM Transactions on Graphics, Vol. 18, No. 4, October 1999, Pages 329-360), this technique may be used to generate piecewise linear segments that together represent a parametric curve. Another conventional algorithm for subdividing curves inserts a subdivision point at the curve parameter that corresponds to the maximum chord error of the curve (or a portion of the curve, when applied recursively).

SUMMARY

A system and method for approximating 2D or 3D parametric curves may subdivide curves using an optimal number of subdivisions, i.e. the minimum number of subdivisions necessary to meet a given error tolerance. By subdividing a curve into fewer segments than conventional methods, the system and methods described herein may allow an alternate representation of the curve to be generated that includes less data than one generated using conventional methods. For example, inserting fewer subdivision points may define fewer piecewise linear or piecewise curve segments for inclusion in a compact alternate representation of the curve. Consequently, the alternate representation may be displayed faster, and may be saved with a better compression rate (i.e. using less memory) than one generated using conventional methods. Optimizing a curve approximation in terms of the number of segments may be especially useful when transforming CAD parametric curves with complex definitions into simpler entities that can be stored in various other formats for downstream applications, e.g. for PRC formatted files or 3DPDF.

The methods described herein may in some embodiments include accessing data representing at least a portion of a parametric curve, and determining a subdivision point along the curve such that when two linear segments are defined that connect the subdivision point to respective endpoints of the curve, the maximum error on one side of the subdivision point is equal to the maximum error on the other side of the subdivision point, where the maximum error is the maximum distance between the curve and the resulting approximation. In some embodiments, determining a subdivision point may include defining a set of simultaneous equations representing relationships between the subdivision point and the respective points of maximum error on each side of the subdivision point and solving the set of simultaneous equations using a suitable iterative solver. In some embodiments, prior to solving the set of simultaneous equations, the method may include initializing variables representing the subdivision point and the respective maximum error points using values that are dependent on the midpoint of the parametric curve.

After determining a subdivision point, the method may include dividing the parametric curve into two sub-portions at the subdivision point. The subdivision technique may be applied recursively to the two sub-portions if the maximum error is greater than a pre-determined error tolerance. The pre-determined error tolerance may comprise a default error tolerance, an application-specific error tolerance, or a user-configurable error tolerance, in various embodiments. The method may also include storing data indicative of the subdivision point and/or the two sub-portions (e.g., two piecewise linear or curve segments defined by the subdivision point) for later use.

In some embodiments, the data indicative of the subdivision point(s) and/or segments generated using the methods described herein may by used to produce an alternate representation of the parametric curve and/or a complex model of a 2D or 3D object of which the parametric curve is a part. This alternate representation may be stored for later use and may constitute a more compact representation of the curve or object than its original representation.

In various embodiments, the methods described herein may be implemented as program instructions, (e.g., stored on computer-readable storage media) executable by one or more CPUs and/or GPUs, including one or more multi-core or multi-threaded processors. For example, they may be implemented as program instructions that, when executed, implement subdividing a parametric curve using the fewest subdivision point necessary to meet a given error tolerance, as described in detail herein.

Figure 1A:
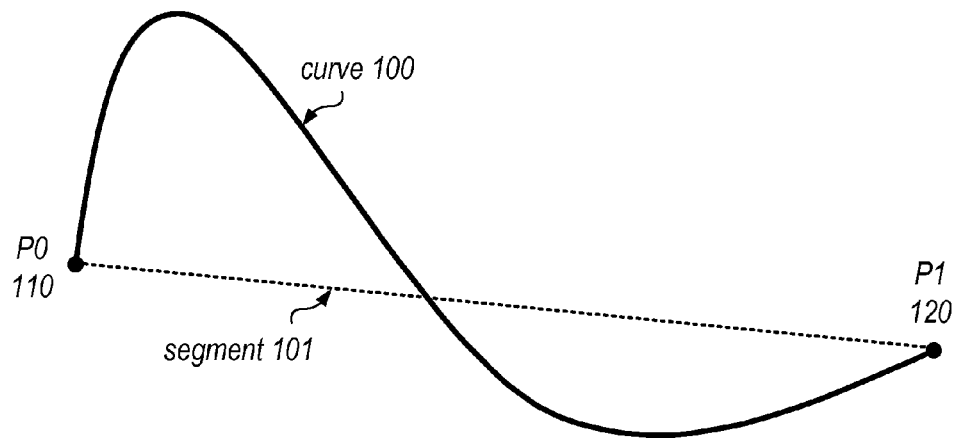
FIG. 1A illustrates a parametric curve for which a representation approximating the curve is to be generated.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The system and methods described herein may in some embodiments be used to approximate 2D or 3D parametric curves (e.g., using piecewise curve or piecewise linear segments), while respecting a given error tolerance (which refers to the maximum allowed distance between the curve and the resulting approximation of that curve) and ensuring that the result is achieved with an optimal number of simpler entities. Using the system and methods described herein for inserting subdivision points in parametric curves, approximations of the curves may be created that include fewer subdivision points, and thus fewer segments. Consequently, in some embodiments, the image objects they represent may be rendered and/or displayed more quickly than if they were approximated using conventional methods. In addition, they may be stored more compactly than if they were subdivided using conventional methods. In other words, the system and methods described herein for approximating parametric curves may result in an improved compression rate for those curves when compared to the results obtained using conventional methods, and may result in improved performance when rendering 3D object representations that include these compacted curve representations.

In general, it may be preferable to insert subdivision points in a parametric curve to define the segments of a corresponding piecewise representation of that curve such that the subdivision points lie exactly on the original curve. For example, if the subdivision points lie on the original curve, users may in some embodiments select these points for measurement purposes when an image of the corresponding 3D object is rendered in an image editing application or other graphics application according to the piecewise representation. In addition, it may be preferable to minimize the number of segments included in a piecewise representation of a parametric curve, e.g., for performance reasons. As noted above, subdividing parametric curves using an optimal number of segments (e.g., subdividing the curves using the minimum number of subdivisions required to meet a desired error tolerance) may in some embodiments reduce the amount of memory needed to store and/or display the image, and/or may increase the speed at which the image can be rendered due to its less complex representation. Optimizing a curve approximation in terms of the number of segments it includes may in some embodiments be useful when transforming parametric curves with complex definitions into simpler entities that can be stored in various other formats for downstream applications, e.g., various 3D file formats, such as PRC or 3D PDF. The systems and methods described herein may generate such representations with a substantially reduced PDF file size, as compared to conventional approximation methods.

As previously noted, algorithms to generate alternate representations of parametric curves (i.e. approximations of those curves) with a plurality of segments exist in various graphics applications and graphics products, and these algorithms may employ one of several conventional methods for subdividing a parametric curve. FIGS. 1A-1D illustrate two such conventional methods for subdividing a curve. In this and subsequent examples described herein, a parametric curve may be defined by a function, c(t), that maps each value of the curve parameter t within an interval [T0, T1] to a point in space (e.g., 2D or 3D space). Thus, determining a point at which to subdivide the parametric curve may comprise determining a subdivision point on the curve corresponding to a given value of the curve parameter t. The subdivision techniques described herein may also be thought of (and/or referred to herein) as techniques for inserting a subdivision point in a parametric curve.

FIG. 1A illustrates a parametric curve 100 that is to be subdivided, for example, to produce an alternate representation of the parametric curve. In this figure, segment 101 represents a linear segment connecting the two endpoints of curve 100, P0 (110) and P1 (120). As shown in FIG. 1A, this single linear segment may not represent curve 100 very well in most graphics applications.

Figure 1B:
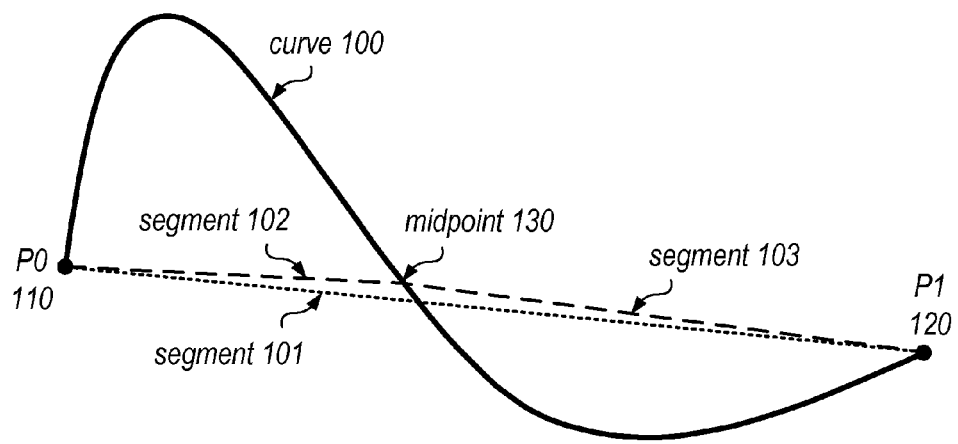
FIG. 1B-1D illustrate conventional methods for subdividing a parametric curve to generate an approximation of the curve illustrated in FIG. 1A.

As previously noted, algorithms for generating alternate representations approximating parametric curves often employ one of two conventional strategies to insert subdivision points in the curve that define segments in the alternate representation. One conventional technique recursively subdivides a parametric curve at its midpoint. For example, for a curve c(t) defined over an curve interval [T0, T1], the curve parameter, tin, may be computed as the curve parameter corresponding to the midpoint of the curve as follows: tm=(T0+T1)/2. This approach is illustrated in FIG. 1B. In this figure, segment 101 again represents a linear segment connecting the two endpoints of curve 100 (i.e. P0 and P1). Segments 102 and 103 of FIG. 1B represent two piecewise linear segments produced by subdividing the parametric curve 100 at the midpoint of the curve (shown in FIG. 1B as midpoint 130). In other words, this subdivision point (corresponding to a curve parameter $t_1$) is used to define segments 102 and 103, which are linear segments that connect midpoint 130 to each of the endpoints of curve 100, P0 and P1, respectively. As shown in FIG. 1B, the resulting piecewise representation of curve 100 produced by a single application of this algorithm (i.e. the representation that collectively includes segments 102 and 103) may not adequately represent curve 100 in many graphics applications.

Figure 1C:
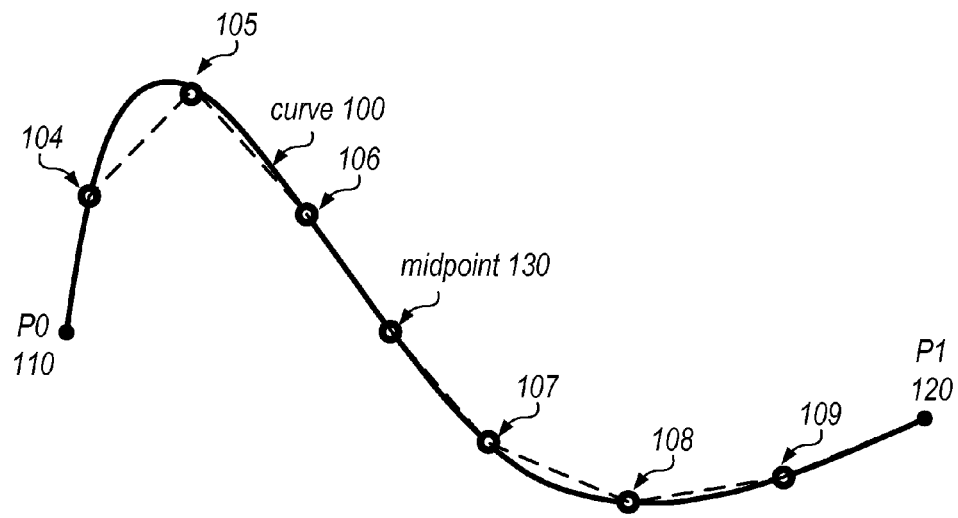

As described above and in "A Unified Approach for Hierarchical Adaptive Tesselation of Surfaces", this technique may be applied recursively to further subdivide the curve and to generate smaller piecewise linear segments that together represent the parametric curve, and this recursion may be terminated when a user-defined sampling density is reached. This is illustrated in FIG. 1C. This figure illustrates an approximation of curve 100 generated by employing this first conventional subdivision method over several iterations. As shown in FIG. 1C, the recursive application of this technique results in an approximation of curve 100 based on subdividing the curve at points 104, 105, 106, 130, 107, 108, and 109. The approximation includes eight linear segments formed between points 110 and 104, 104 and 105, 105 and 106, 106 and 130, 130 and 107, 107 and 108, 108 and 109, and 109 and 120. As shown in this example, even after several iterations, the maximum error (which appears between curve 100 and the segment connecting 104 and 105) is relatively large. Therefore, it may be necessary to perform a large number of iterations (and to produce a large number of subdivision points and corresponding segments) to achieve a satisfactory result.

Figure 1D:
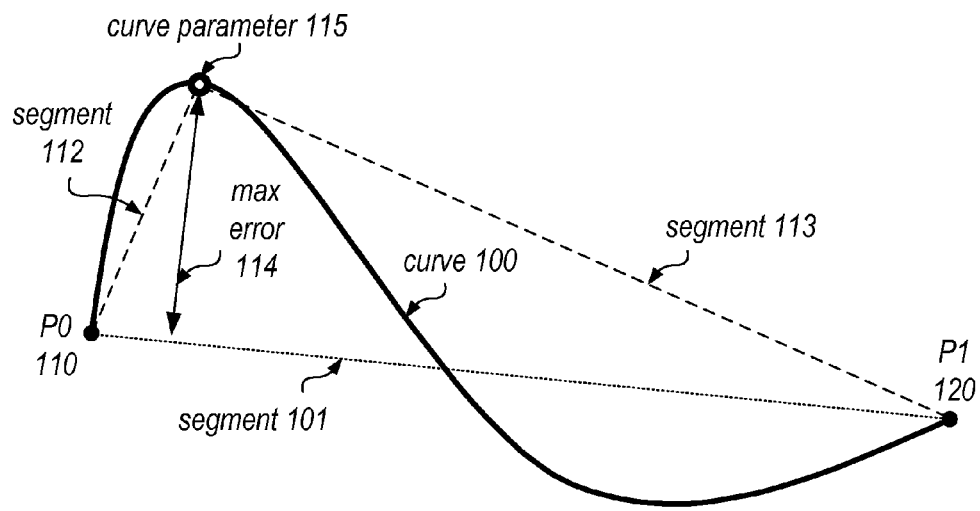

FIG. 1D illustrates another conventional technique for subdividing a parametric curve 100. In this example, a subdivision point is inserted at the curve parameter that corresponds to the maximal chord error. As used herein, the term "chord error" refers to an error metric that is computed as the distance between a point on the curve and a linear segment (in this case, segment 101) that connects the endpoints of the curve (or portion thereof) being subdivided (in this case, P0 and P1). In this example, a curve parameter 115 is inserted at the point on curve 100 corresponding to the maximal chord error (shown as max error 114). Curve 100 is subdivided at this point, and linear segments 112 and 113 are defined that connect curve parameter 115 to each of the endpoints, respectively. This approach may produce better results than the approach that always subdivides a curve (or curve portion) at its midpoint when the original curve does not oscillate. However, if the curve to be subdivided does oscillate, this approach may produce unacceptable results, as shown in FIG. 1D. As in the previous example, this technique may be applied iteratively (i.e. recursively) to further subdivide the curve and to generate smaller piecewise linear segments that together approximate the parametric curve 100. The subdivision technique used in this example will choose poorly in the next iteration, identifying one subdivision point at a point on curve 100 at which the maximum chord error exists between curve 100 and segment 112 (i.e. identifying a curve parameter in a portion of the curve at which there is relatively little distance between the curve and its approximation), in addition to a subdivision point on curve 100 at which the maximum chord error exists between curve 100 and segment 113 (i.e. identifying a curve parameter in a portion of the curve at which the curve is relatively far from its approximation). As in the previous example, a large number of iterations (producing a large number of subdivision points and corresponding segments) may be required in order to achieve a satisfactory result.

The system and methods described herein may in some embodiments be used to subdivide (recursively) curves, surfaces and meshes in a way that splits each curve thereof such that the curve can be approximated by fewer segments. In other words, various embodiments of a method for approximating a curve may include subdividing it recursively, and, at each step, inserting subdivision points on the curve. The methods described herein may address not only the question, "Does the curve need to be split (again), or does it match the desired error tolerance?" but also, "where should the curve (or portion thereof) be cut?" The system and methods described herein may be used to identify (for each iteration), an optimal curve parameter t1 for a curve c(t) such that the error is balanced on the two sides of the point corresponding to the curve parameter. By choosing the best curve parameter t1 at which to subdivide the curve for each iteration, this subdivision technique may identify the best two segments for a piecewise approximation every time the curve is split. In this way, the curve may be approximated using the fewest number of subdivision points, while meeting the desired error tolerance. As each curve parameter corresponding to a subdivision point is calculated, data representing the subdivision point (e.g., the value of the curve parameter, the 2D or 3D coordinates of the subdivision point, and/or an identifier of the subdivision point) may be stored in a data structure or file (e.g., according to any of various data formats and/or graphics file formats) for later use. For example, all of the subdivision points identified for a curve or surface may be subsequently analyzed and/or processed to determine a series of line segments, curve segments, and/or triangles defined by the subdivision points, and these segments or triangles may collectively constitute a representation of the original curve or surface that approximates the curve or surface within a desired error tolerance, but that is more compact than a representation that is more precise than this approximation.

Approximating a curve using the fewest number of subdivision points necessary to meet a desired error tolerance may be especially useful in applications in which data size is a critical concern. In such situations, the solution described herein may produce better results than currently existing methods for approximating curves, such as those illustrated in FIGS. 1B-1D and described above. For example, in some graphics applications, meshes are created from 3D models (i.e. from an exact geometry). These meshes are then compressed in files by approximating the curves of the meshes with a collection of linear segments. Similarly, an approximate representation of a surface may be generated as a collection of triangles defined by such line segments. In these and other applications, the methods described herein may in some embodiments be used to generate smaller files than if currently existing curve approximation methods were used. Unlike with some existing methods, the system and methods described herein may guarantee that, generally, fewer segments are used to approximate a parametric curve, irrespective of the shape of the original curve.

Figure 2:
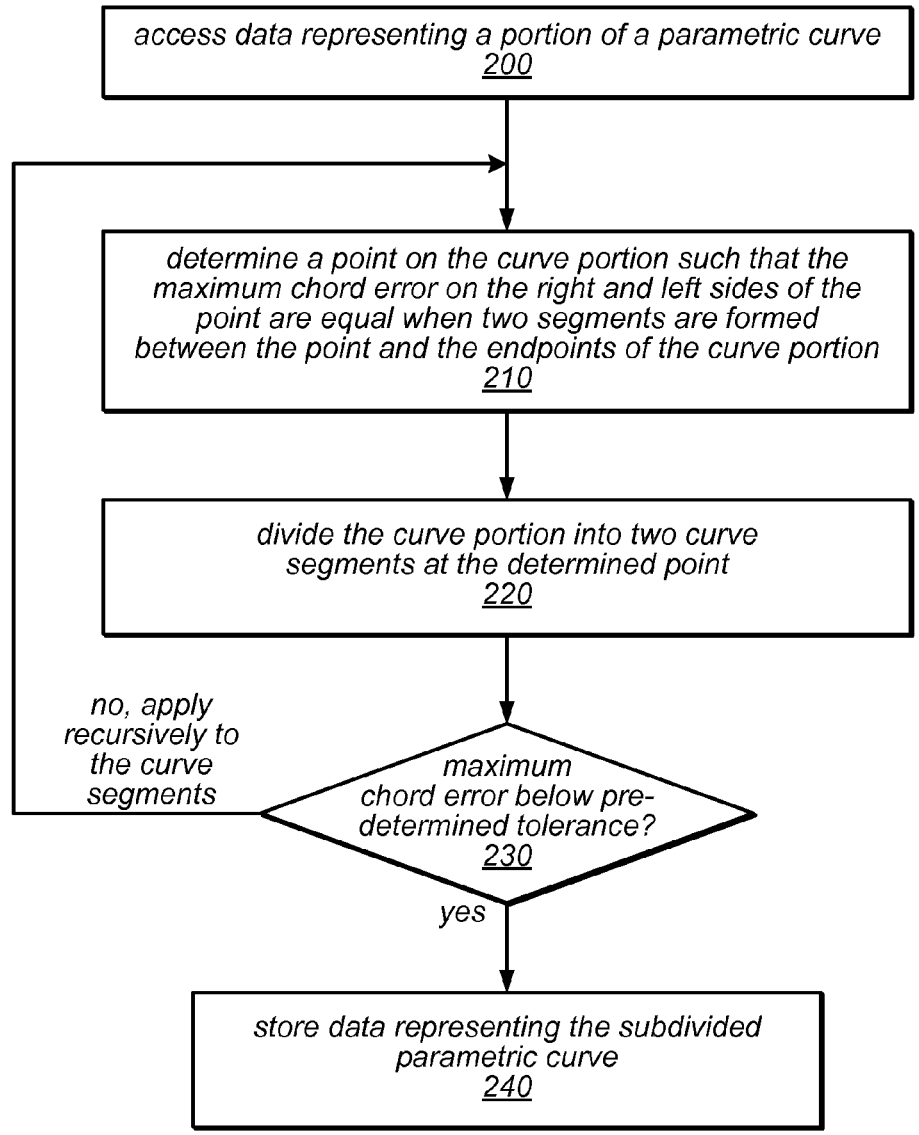
FIG. 2 is a flow diagram illustrating a method for approximating a parametric curve using an optimal number of segments, according to various embodiments.

One method for subdividing a parametric curve to produce a more compact approximate representation of the curve is illustrated by the flow diagram in FIG. 2. As shown in this example, the method may include accessing data representing at least a portion of a parametric curve, as in 200. For example, the curve may represent a 2D or 3D curve in space, a curve making up a portion of a surface mesh, a curve representing mathematical or scientific data, or any other type of curve for which generation of a more compact approximation (e.g., for storage, display, etc.) would be useful. The curve may also represent one segment of a curve that has already been subdivided (e.g., by a previous iteration in a recursive application of the method illustrated in FIG. 2).

Figure 3:
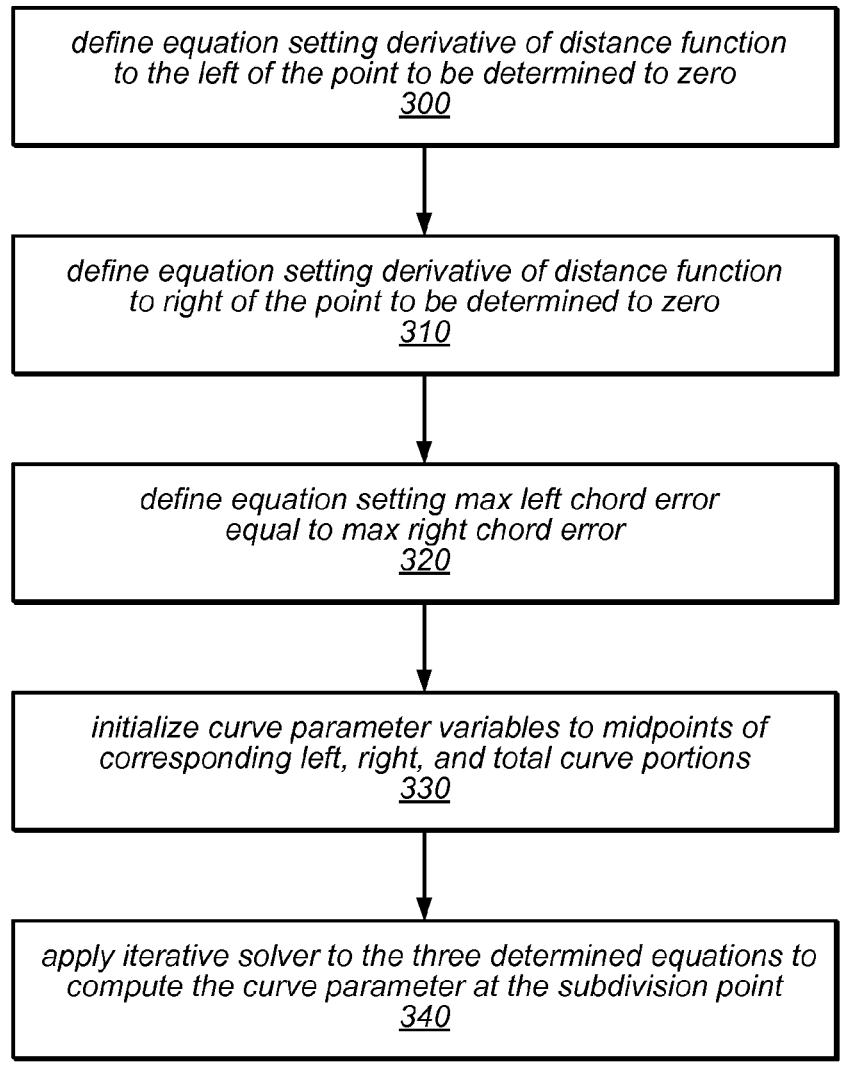
FIG. 3 is a flow diagram illustrating a method for determining a point at which to subdivide a parametric curve to generate an approximation of the curve, according to various embodiments.

As shown in 210 of FIG. 2, the method may include determining a point on the curve (or curve portion) such that the maximum chord error on the right and left sides of the point are equal when respective segments are formed between the point and the two endpoints of the curve. As described above, this point corresponds to a particular value of the curve parameter defining the curve. A method for determining this curve parameter is illustrated in FIG. 3 and described below, according to various embodiments. As shown in this example, the method may include dividing the parametric curve (or portion thereof) into two curve segments at the determined subdivision point. This is illustrated as 220 in FIG. 2.

As illustrated in FIG. 2, the method may include determining whether the maximum chord error following the insertion of the determined point is less than a given pre-determined error tolerance, as in 230. For example, in some embodiments, the error tolerance may be a default error tolerance or user-configurable (i.e. user-specified) error tolerance. In other embodiments, the error tolerance may be an application-specific error tolerance, since the suitability of the approximation may be dependent on how the approximation will be used. For example, if the approximation will be visually displayed to a user in a relatively low-resolution application, the acceptable error may be higher than if the approximation will be used to make precise calculations (e.g., for measurements, complex editing operations, etc.).

If the maximum error following the insertion of the determined subdivision point is not less than the specified error tolerance, the method may include recursively applying the operations illustrated in 210 and 220 to each (i.e. both) of the two curve segments produced by subdividing the curve portion at the determined point to further divide these two curve segments. This is illustrated in FIG. 2 as the feedback from the negative exit from 230 to 210. Note that because the method described herein determines the subdivision point at which the maximum distances between the curve and its approximation on each side of the point are equal, these operations will always be applied recursively to both of the resulting curve segment or to neither of them.

If the maximum error is less than the specified error tolerance, shown as the positive exit from 230, the method may include storing data representing the subdivided parametric curve, as in 240. For example, the method may include storing data representing the linear segments or curve segments defined by pairs of the subdivision points (which together may represent a compact approximation of the curve), and/or data indicating the curve parameters, the 2D or 3D coordinates of the subdivision points, etc. As previously noted, in some embodiments, such data may be stored in a data structure or file, according to various graphics formats, for later use. In some embodiments, rather than storing such data after all of the subdivision points, segments, and/or triangles have been determined, data indicating each subdivision point (or any other intermediate data) may be stored as is it calculated (not shown).

The operations illustrated in FIG. 2 may be implemented using any of various mathematical algorithms for calculating the curve parameters corresponding to suitable subdivision points. For example, different mathematical algorithms may be applied to the calculations in different embodiments, as long as subdivision points are inserted at curve parameters (t1) such that, once inserted, the maximal errors on the left and the right sides of each subdivision point are equal. As previously noted, a goal of the techniques described herein is to minimize the maximum error for the resulting approximation such that it is less than the desired error tolerance.

The methods described herein may be further illustrated by following pseudo code. Note that this pseudo code represents just one example of the type of calculations that may be used to a determine subdivision point on a curve at which the maximum distances between the curve and its approximation on each side of the subdivision point are equal. For example, in other embodiments, different simultaneous equations may be defined to describe this exercise, and different iterative solvers or solver techniques may be applied to find a solution. In this example the object of the exercise is to find the curve parameter t1 such that $\Delta 1 = \Delta 2$, where $\Delta 1$ and $\Delta 2$ are defined below.

As shown in this example, in some embodiments, the problem may be solved by defining a non-linear system with three equations and three variables, t0, t1, and t2 (where t1 represents the curve parameter at the subdivision point, t0 represents the curve parameter at the point of maximum chord error to the left of the subdivision point, and t2 represents the curve parameter at the point of maximum chord error to the left of the subdivision point), as follows:

| $\Delta 1(t0, t1)$ | corresponds to Max(distance(C(t0), Segment1(t1))); max left error | (1) |
|---|---|---|
| $\Delta 2(t1, t2)$ | corresponds to Max(distance(C(t2), Segment2(t1))); max right error | (2) |
| $\Delta 1(t0, t1) = \Delta 2(t1, t2)$ | Left and right max chord errors are equal | (3) |

In this example, let $F1(t0,t1)$ be the vector between $C(t0)$ and its projection on Segment1(t1) and let $F2(t1,t2)$ be the vector between $C(t2)$ and its projection on Segment2(t1). Therefore, the distance between $C(t0)$ and Segment1(t1) may be defined as $sqrt(F1.F1)$.

Therefore, to calculate the maximum left side error (shown in equation 1):

$$\text{Maximize } sqrt(F1(t0,t1)) \leftrightarrow \text{Maximize } F1(t0,t1).F1(t0,t1)$$

Setting the derivatives of the curve at the point of maximum error to 0:

$$dF1(t0,t1)/dt0 = 0 \text{ and } dF1(t0,t1)/dt1 = 0$$

Thus the three equations to be solved, in this example, are:

| $dF1(t0, t1)/dt0 = 0$ | for equation (1) above |
|---|---|
| $dF2(t1, t2)/dt2 = 0$ | for equation (2) above) |
| $\Delta 1(t0, t1) - \Delta 2(t1, t2) = 0$ | for equation (3) above |

In some embodiment, these equations may then be solved through an iterative process, such as by application of a Newton-Raphson solver or any other suitable iterative solver. In this example, the variables t0, t1, t2 may be initialized to values dependent on the curve parameter value at the midpoint of the curve, as shown below. In other embodiments, they may be initialized using different values.

$$t1=(T0+T1)/2.0$$

$$t0=(T0+t1)/2.0$$

$$t2=(T1+t1)/2.0$$

where [T0, T1] represents the curve interval.

The method described above for determining a point at which to subdivide a curve is further illustrated by the flow diagram in FIG. 3. As described above, the method may include defining a system of simultaneous equations in terms of the curve parameters at the subdivision point (t1) and at the points of maximum chord error on either side of the subdivision point (t0 and t2). In some embodiments, the method may include determining the inflection points of a curve to be subdivided (e.g., local minimums and/or maximums) by setting the first derivative of the curve to zero and solving for the point(s) at which this is true (i.e. solving for the points at which the gradient of the curve is zero). As illustrated in 300 of FIG. 3, the method may include defining an equation that sets the derivative of the distance function F1 to zero. A point at which the derivative of the distance function F1 is zero corresponds to the point of maximum distance between the curve and its approximation. As illustrated in 310, the method may also include defining an equation that sets the derivative of the distance function F2 to zero.

As described above, the method may include determining the point at which the maximum chord error to the left of the point is equal to the maximum chord error to the right of the point. Therefore, as shown in FIG. 3, the method may include defining an equation that sets the maximum chord error to the left of the subdivision point equal to the maximum chord error to the right of the subdivision point, as in 320. As described above, in some embodiments the variables t0, t1, and t2 representing various curve parameters in these equations may be initialized to default values, such as values dependent on the curve parameter value at the midpoint of the corresponding curve portions. This is illustrated in 330 of FIG. 3.

As described above, an iterative solver (such as a Newton-Raphson solver or another suitable solver) may be applied to the system of equations to compute the curve parameter values at the subdivision point and at the points of maximum chord error on either side of the subdivision point. This is illustrated as 340 in FIG. 3.

The methods for subdividing a curve illustrated in FIGS. 2-3 and described above may be further illustrated by way of the example shown in FIGS. 4A-4D. In this example, a parametric curve 100, similar to that illustrated in FIG. 1A, is to be subdivided at a plurality of points, and an approximation of the curve is to be generated that includes a collection of piecewise linear segments defined by these points. As described herein, in some embodiments, the goal of the exercise may be to generate a representation of the curve that includes the fewest subdivision points (and, therefore, the fewest linear segments) needed to represent the parametric curve while meeting a pre-determined error tolerance.

In this example, a single linear segment connecting the two endpoints of curve 100 (shown as P0 and P1, at 110 and 120, respectively) may not adequately represent the curve. Therefore, the methods described herein may be recursively applied to determine the minimum set of subdivision points that may be required to define a piecewise linear representation of curve 100 that meets a pre-determined error tolerance.

Figure 4A:
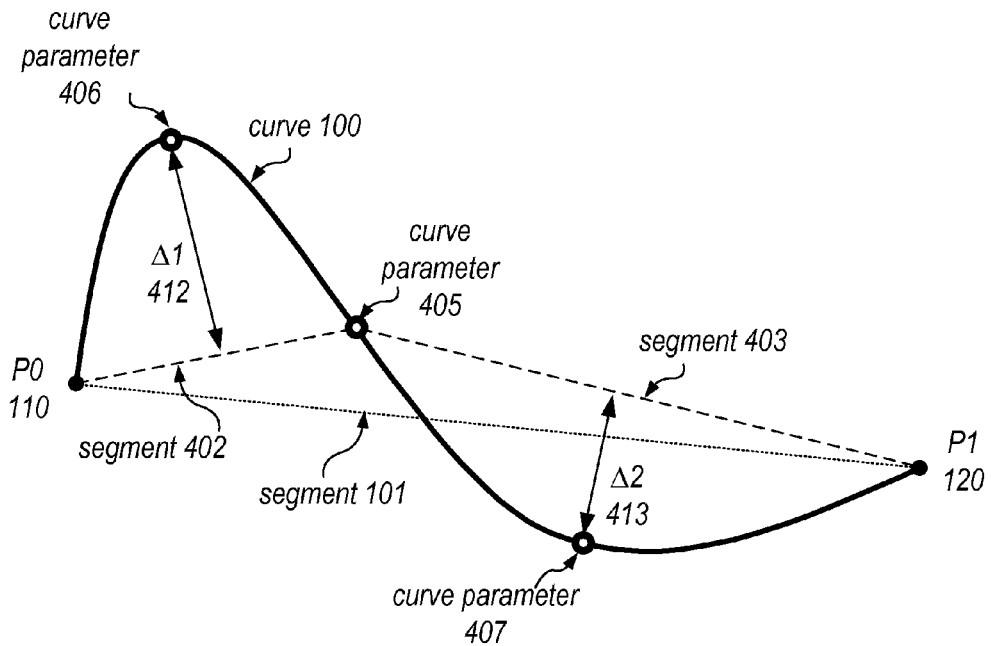
FIGS. 4A-4D illustrate the subdividing of a parametric curve, according to various embodiments.

In this example, a first application of the methods described above may identify the point corresponding to curve parameter 405 as the point on curve 100 at which the maximum chord error to the left of 405, shown as $\Delta 1$ (412), is equal to the maximum chord error to the right of 405, shown as $\Delta 2$ (413). As illustrated in FIG. 4A, the maximum chord error to the left of 405 occurs at the point corresponding to curve parameter 406. This is the point at which curve 100 is farthest from a segment connecting endpoint P0 (110) and the point corresponding to curve parameter 405, which is illustrated as segment 402. In this example, the maximum chord error to the right of 405 occurs at the point corresponding to curve parameter 407. This is the point at which curve 100 is farthest from a segment connecting the point corresponding to curve parameter 405 and endpoint P1 (120), which is illustrated as segment 403.

As described above, when applying the method described above, $\Delta 1$ is equal to $\Delta 2$, and represents the maximum chord error for the solution so far. In this example, the value of $\Delta 1$ and $\Delta 2$ is greater than a pre-determined error tolerance, indicating that the two piecewise linear segments 402 and 403 are not sufficient to represent curve 100 within the pre-determined error tolerance. Therefore, the method described above is applied recursively to further subdivide curve 100.

Figure 4B:
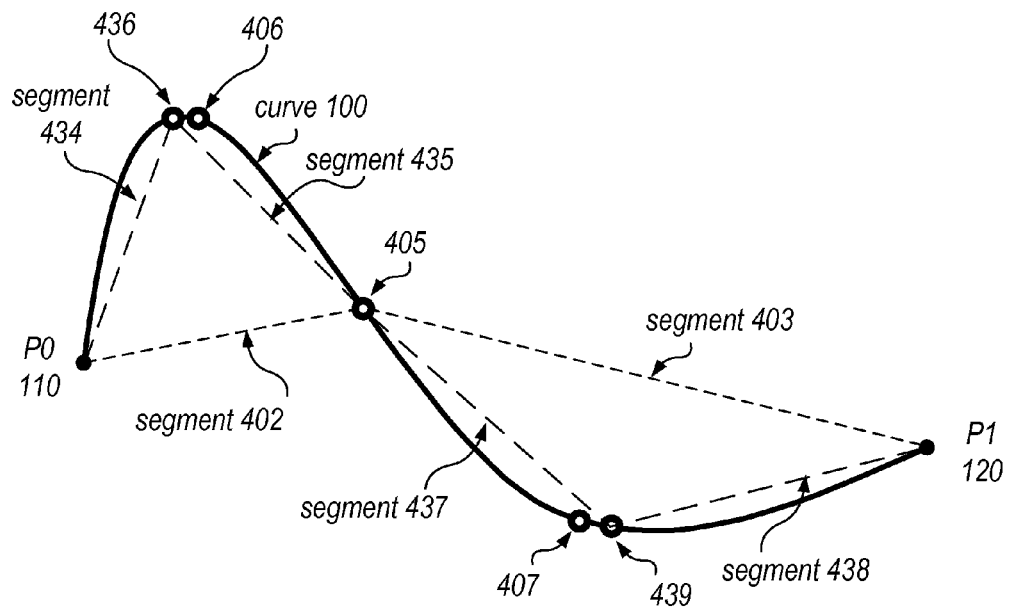
Figure 4C:
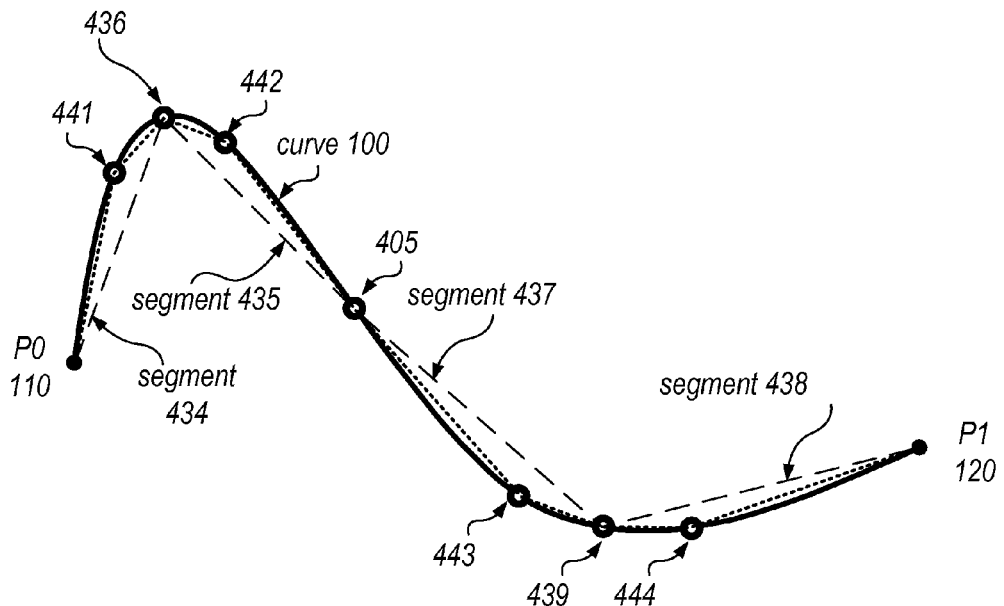

FIG. 4B illustrates the results of a further subdivision of the two portions of curve 100 defined by the subdivision of the curve at 405. In this example, the portion of the curve to the left of 405 is further subdivided at the point on the curve corresponding to curve parameter 436. This is the result of determining that the maximum chord error to the left of 436 (defined as the maximum distance between segment 434 and curve 100) would be equal to the maximum chord error to the right of 436 (defined as the maximum distance between segment 435 and curve 100). Similarly, the portion of the curve to the right of 405 is further subdivided at the point on the curve corresponding to curve parameter 439. This is the result of determining that the maximum chord error to the left of 439 (defined as the maximum distance between segment 437 and curve 100) would be equal to the maximum chord error to the right of 439 (defined as the maximum distance between segment 438 and curve 100). In this example, the four piecewise linear segments (434, 435, 437, and 438) defined by endpoints P0 (110) and P1 (120), and the three subdivision points identified so far (at 436, 405, and 439) more faithfully represent curve 100 than the two piecewise linear segments (402 and 403) defined by the first application of the subdivision method. However, in this example, the maximum chord error for this partial solution (defined as the maximum distance between segments 434, 435, 437, and/or 438 and curve 100) may still be greater than the pre-determined error tolerance for this exercise. Therefore, the method may be recursively applied to further subdivide the portions of curve 100 defined by endpoints P0 (110), P1 (120), and subdivision points 436, 405, and 439.

Figure 4D:
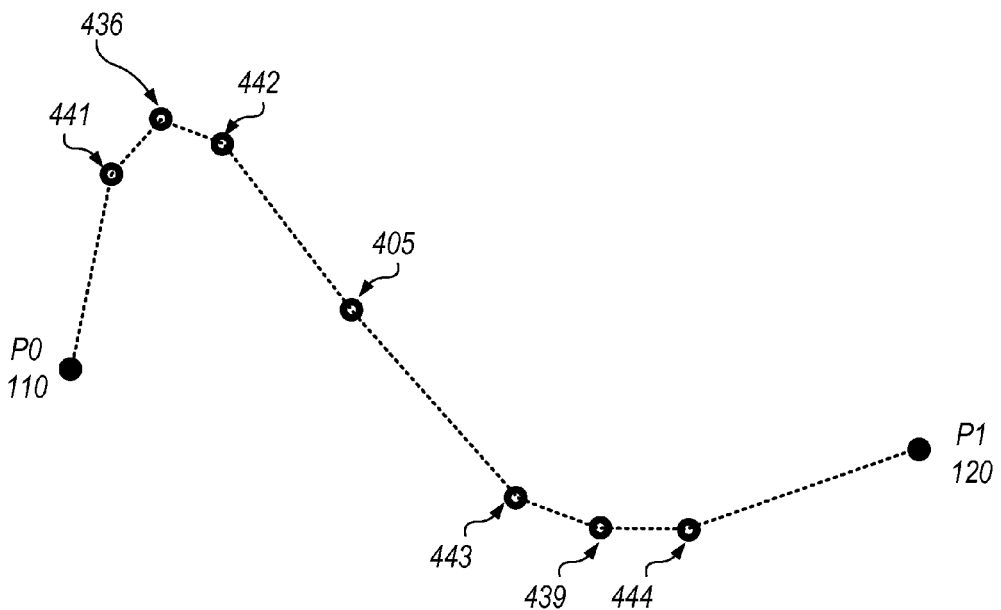

FIG. 4D illustrates the results of a further subdivision of curve 100 using the methods described herein. In this example, additional subdivision points are identified at the points corresponding to curve parameters 441, 442, 443, and 444, using the methods described herein for finding the points at which the maximum chord error to the left and right of a subdivision point are equal. In this example, the maximum chord error following this application of the method is less than the pre-determined error tolerance. Therefore, the representation of curve 100 defined by endpoints P0 (110) and P1 (120), and subdivision points 441, 436, 442, 405, 443, 439, and 444 is sufficient for the purposes of this exercise, and may be stored for further use in a graphics application or other application in a more compact form than a representation of curve 100 that includes a larger number of curve points. FIG. 4D illustrates the resulting piecewise linear representation of curve 100, which, as shown, may be a reasonable approximation of curve 100 for use in various applications.

While several of the examples included herein describe the generation of a curve approximation made up of piecewise linear segments, in other embodiments, the methods described herein may be used to generate curve approximations of other formats. For example, the methods described herein may be used to identify subdivision points on a parametric curve, and these subdivision points may be used to divide the curve into piecewise curve segments, rather than piecewise linear segments. In some embodiments, the curve segments into which a parametric curve is subdivided using these methods may be of the same type as the original curve (e.g., a Bézier curve) and/or may include the same magnitude of information as the original curve. In other embodiments, these curve segments may together constitute an alternate representation of the parametric curve suitable for representing the curve in a variety of graphics applications or other types of applications (e.g., a piecewise Bézier curve representation, a piecewise hermite curve representation, or a b-spline representation).

Some embodiments of the system described herein may include a means for defining a set of simultaneous equations to be used in determining a subdivision point for a parametric curve. For example, an equation definition module may define an equation that sets the derivative of the distance function to the left of the point to be determined to zero, define an equation that sets the derivative of the distance function to the right of the point to be determined to zero, and define an equation that sets the maximum chord error to the left of the point to be determined equal to the maximum chord error to the left of the point to be determined, as described in detail herein. The equation definition module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform defining an equation that sets the derivative of the distance function to the left of the point to be determined to zero, defining an equation that sets the derivative of the distance function to the right of the point to be determined to zero, and defining an equation that sets the maximum chord error to the left of the point to be determined equal to the maximum chord error to the left of the point to be determined, as described in detail herein. Other embodiments of the equation definition module may be at least partially implemented by hardware circuitry and/or firmware stored, for example, in a non-volatile memory.

Some embodiments of the system described herein may include a means for solving a set of simultaneous equations defined as part of an operation to subdivide a parametric curve. For example, a solver module may initialize the variables of the set of simultaneous equations (including a variable representing a subdivision point for the parametric curve), and apply an iterative solver to compute the subdivision point, as described in detail herein. The solver module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform initializing the variables of the set of simultaneous equations (including a variable representing a subdivision point for the parametric curve), and applying an iterative solver to compute the subdivision point, as described in detail herein. Other embodiments of the solver module may be at least partially implemented by hardware circuitry and/or firmware stored, for example, in a non-volatile memory.

Some embodiments of the system described herein may include a means for dividing a parametric curve into a plurality of segments at determined subdivision points. For example, a curve divider module may generate an alternate representation of a parametric curve (e.g., a piecewise linear representation, or a piecewise curve representation) based on one or more determined subdivision points, and may store that alternate representation for later use, as described in detail herein. The curve divider module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform generating an alternate representation of the parametric curve (e.g., a piecewise linear representation, or a piecewise curve representation) based on the one or more determined subdivision points, and storing that alternate representation for later use, as described in detail herein. Other embodiments of the curve divider module may be at least partially implemented by hardware circuitry and/or firmware stored, for example, in a non-volatile memory.

Some embodiments of the system described herein may include a means for determining whether an alternate representation of a parametric curve meets a pre-determined error tolerance, and invoking a recursive application of a subdivision operation in response to determining that the alternate representation does not meet the pre-determined error tolerance. For example, a tolerance analyzer module may determine whether an alternate representation of a parametric curve (e.g., a piecewise linear or piecewise curve representation generated using the subdividing techniques described herein) meets a pre-determined error tolerance, and may invoke a recursive application of the subdivision techniques in response to determining that the alternate representation does not meet the pre-determined error tolerance, as described herein. The tolerance analyzer module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform determining whether an alternate representation of a parametric curve meets a pre-determined error tolerance, and invoking a recursive application of a subdivision operation in response to determining that the alternate representation does not meet the pre-determined error tolerance, as described in detail herein. Other embodiments of the tolerance analyzer module may be at least partially implemented by hardware circuitry and/or firmware stored, for example, in a non-volatile memory.

Figure 5:
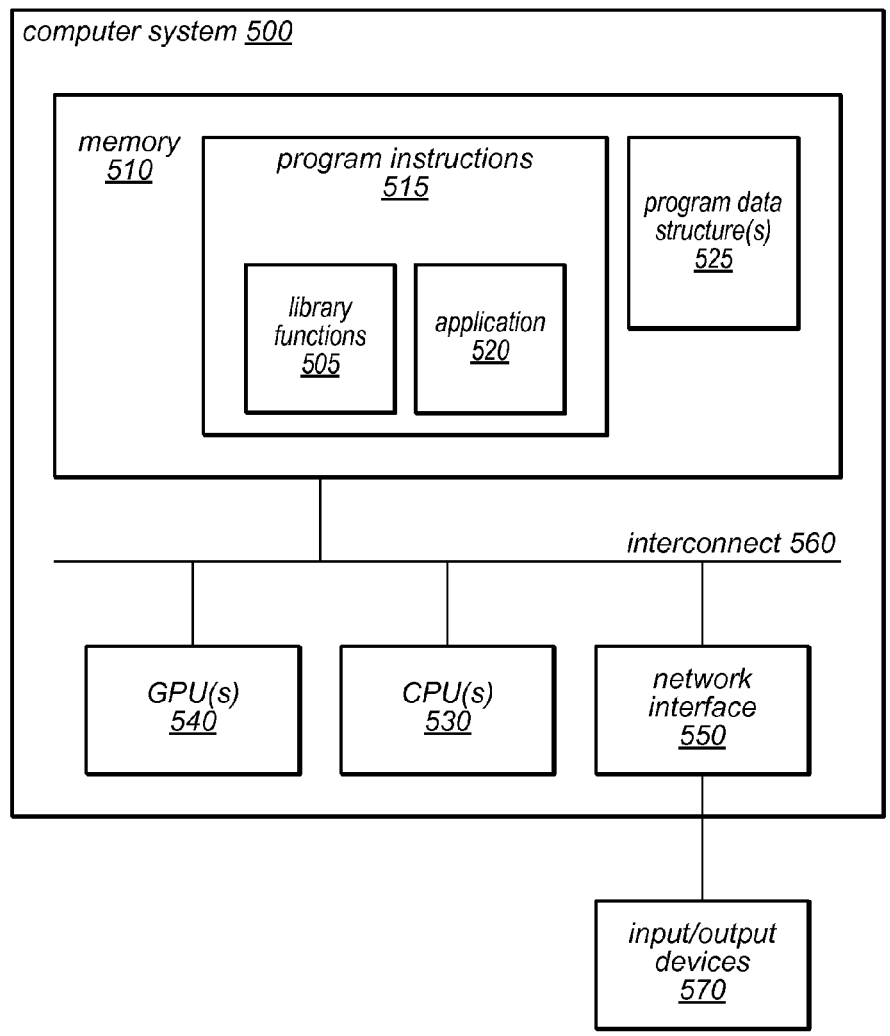
FIG. 5 illustrates a computer system configured to implement approximating a parametric curve, according to some embodiments.

The methods described herein for subdividing a parametric curve using an optimal number of subdivision points (and therefore an optimal number of segments) may in some embodiments be implemented by a computer system configured to provide the functionality described. FIG. 5 is a block diagram illustrating one embodiment of a computer system 500 configured to implement the subdivision techniques described herein. Computer system 500 may be any of various types of devices, including, but not limited to, a personal computer system, desktop computer, laptop, notebook or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

As illustrated in FIG. 5, computer system 500 may include one or more processor units (CPUs) 530. Processors 530 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. In various embodiments, the methods disclosed herein for subdividing a parametric curve may be implemented by program instructions configured for parallel execution on two or more such CPUs. For example, functions for performing defining a set of simultaneous equations, solving a set of simultaneous equations, dividing a parametric curve into a plurality of segments, or determining whether an alternate representation of a parametric curve meets a pre-determined error tolerance may be distributed for independent and/or concurrent execution on two or more of CPUs 530, or on multiple processing cores of a single CPU 530, in some embodiments. Any desired operating system(s) may be run on computer system 500, such as various versions of Unix, Linux, Windows™ from Microsoft Corporation, MacOS™ from Apple Corporation, or any other operating system that enables the operation of software on a hardware platform.

As illustrated in FIG. 5, computer system 500 may also include one or more graphics processing units (GPUs) 540. A GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, a GPU 540 may implement a number of graphics primitive operations in a way that makes executing them much faster than drawing directly to the screen with a host CPU, such as CPU 530. In various embodiments, the methods disclosed herein for subdividing parametric curves may be implemented by program instructions configured for parallel execution on two or more such GPUs. For example, functions for performing defining a set of simultaneous equations, solving a set of simultaneous equations, dividing a parametric curve into a plurality of segments, or determining whether an alternate representation of a parametric curve meets a pre-determined error tolerance may be distributed for independent and/or concurrent execution on two or more GPUs, in some embodiments. The GPU 540 may implement one or more application programmer interfaces (APIs) that permit programmers to invoke the functionality of the GPU. Suitable GPUs may be commercially available from vendors such as NVIDIA Corporation, ATI Technologies, and others.

GPUs, such as GPU 540 may be implemented in a number of different physical forms. For example, GPU 540 may take the form of a dedicated graphics card, an integrated graphics solution and/or a hybrid solution. GPU 540 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution may find itself competing for the already slow system RAM with the CPU, as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the GPUs 540 and the rest of the computer system 500 may travel through a graphics card slot or other interface, such as interconnect 560 of FIG. 5.

As illustrated in FIG. 5, computer system 500 may include one or more system memories 510 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 500 via interconnect 560. Memory 510 may include other types of memory as well, or combinations thereof. In the example illustrated in FIG. 5, memory 510 may represent any of various types and arrangements of memory, including general-purpose system RAM and/or dedication graphics or video memory.

One or more of memories 510 may include program instructions 515 executable by one or more of CPUs 530 and/or GPUs 540 to implement aspects of the techniques for subdividing parametric curves described herein. Program instructions 515, which may include program instructions configured to implement application 520, may be partly or fully resident within the memory 510 of computer system 500 at any point in time. Alternatively, program instructions 515 may be provided to GPU 540 for performing graphics operations on GPU 540 using one or more of the techniques described herein. In some embodiments, the techniques described herein may be implemented by a combination of program instructions 515 executed on one or more CPUs 530 and one or more GPUs 540, respectively. In embodiments in which application 520 comprises an image editing application or another graphics application, application 520 may be configured to render modified images to a separate window, or directly into the same frame buffer containing an input image. In some embodiments, application 520 may utilize a GPU 540 when rendering or displaying images according to various embodiments. Application 520 may represent (or be a module of) various types of graphics applications, such as painting, publishing, photography, games, or animation applications, or may represent (or be a module of) another type of application. Please note that functionality and/or features described herein as being part of, or performed by, application 520 may, in some embodiments, be part of, or performed by, one or more graphics processors, such as GPU 540.

As illustrated in FIG. 5, program instructions 515 may in some embodiments include various library functions 505, such as library functions described herein for supporting the subdividing of a parametric curve (e.g., for defining a set of simultaneous equations, solving a set of simultaneous equations, dividing a parametric curve into a plurality of segments, or determining whether an alternate representation of a parametric curve meets a pre-determined error tolerance). Various ones of these library functions 505 may be executable on one or more of CPUs 530 and/or GPUs 540 to cause computer system 500 to provide the functionality described herein.

Program instructions 515 may be stored on an external storage device (not shown) accessible by CPUs 530 and/or GPUs 540, in some embodiments. Any of a variety of such storage devices may be used to store the program instructions 515 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the CPUs 530 and/or GPUs 540 through one or more storage or I/O interfaces including, but not limited to, interconnect 560 or network interface 550, as described herein. In some embodiments, the program instructions 515 may be provided to the computer system 500 via any suitable computer-readable storage medium including memory 510 and/or external storage devices described above.

As illustrated in FIG. 5, memory 510 may be configured to implement one or more program data structures 525, such as one or more data structures configured to store data representing one or more input images, output images, or intermediate images for a graphics application; data representing one or more parametric curves or alternate representations thereof generated using the methods described herein; data representing curve parameters corresponding to subdivision points or curve segments (linear or otherwise); data representing configuration parameters; data representing default, application-specific, or user-configurable application parameters; data representing default, application-specific, or user-configurable error tolerances; or other types of program data for graphics applications and/or other applications. Program data structures 525 may be accessible by CPUs 530 and/or GPUs 540 when executing application 520, library functions 505, or other program instructions with program instructions 515.

Application 520 and/or library functions 505 may be provided as a computer program product, or software, that may include a computer-readable storage medium having stored thereon instructions, which may be used to program a computer system (or other electronic devices) to implement subdividing a parametric curve using an optimal number of subdivision points, as described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums).

As noted above, in some embodiments, memory 510 may include program instructions 515, comprising program instructions configured to implement an application 520 and/or library functions 505, as described herein. Application 520 and/or library functions 505 may be implemented in various embodiments using any desired programming language, scripting language, or combination of programming languages and/or scripting languages, e.g., C, C++, C#, Java™, Perl, etc. For example, in one embodiment, application 520 and/or library functions 505 may be JAVA based, while in another embodiments, they may be implemented using the C or C++ programming languages. In other embodiments, all or a portion of application 520 and/or any of library functions 505 may be implemented using specific graphic languages specifically for developing programs executed by specialize graphics hardware, such as GPU 540. In addition, all or a portion of application 520 and/or any of library functions 505 may be embodied on memory specifically allocated for use by GPUs 540, such as memory on a graphics board including GPUs 540. Thus, memory 510 may represent dedicated graphics memory as well as general-purpose system RAM, in various embodiments. Other information not described herein may be included in memory 510 and may be used to implement the methods described herein and/or other functionality of computer system 500.

Note that program instructions 515 may be configured to implement application 520 as a stand-alone application configured for subdividing a parametric curve, or as a module of another application, in various embodiments. For example, in one embodiment program instructions 515 may be configured to implement graphics applications such as painting, publishing, photography, games, animation, and/or other applications, and may be configured to subdivide parametric curves as part of one or more of these graphics applications. In another embodiment, program instructions 515 may include functions called by a graphics application executed on GPU 540 and/or CPUs 530. Similarly, library functions 505 may in some embodiments be a stand-alone library of functions configured to support subdividing parametric curves using an optimal number of subdivisions, while in other embodiments library functions 505 may be included in a graphics library or in another general purpose library of functions available to application 520 or other program instructions 515.

As shown in FIG. 5, CPUs 530 and/or GPUs 540 may be coupled to one or more of the other illustrated components by at least one communications bus, such as interconnect 560 (e.g., a system bus, LDT, PCI, ISA, or other communication bus type), and a network interface 550 (e.g., an ATM interface, an Ethernet interface, a Frame Relay interface, or other interface). The CPUs 530, the GPUs 540, the network interface 550, and the memory 510 may be coupled to the interconnect 560. It should also be noted that one or more components of system 500 might be located remotely and accessed via a network.

Network interface 550 may be configured to enable computer system 500 to communicate with other computers, systems or machines, such as across a network. Network interface 550 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 500 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 550 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 500 may also include one or more additional I/O interfaces, such as interfaces for one or more user input devices 570, or such devices may be coupled to computer system 500 via network interface 550. For example, computer system 500 may include interfaces to a keyboard, a mouse or other cursor control device, a joystick, or other user input devices 570, in various embodiments. Additionally, the computer system 500 may include one or more displays (not shown), coupled to processors 530 and/or other components via interconnect 560 or network interface 550. Such input/output devices may be configured to allow a user to interact with application 520 to request various operations and/or to specify various parameters, thresholds, error tolerances, and/or other configurable options available to the user when executing application 520. It will be apparent to those having ordinary skill in the art that computer system 500 may also include numerous other elements not shown in FIG. 5.

While various techniques for subdividing parametric curves using an optimal number of subdivisions (e.g., a minimum number of subdivisions required to meet a desired error tolerance) have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system comprising:
    one or more processors;
    a memory having instructions stored thereon that, if executed by the one or more processors, cause the one or more processors to perform operations comprising:
    accessing data representing at least a portion of a parametric curve;
    identifying a subdivision point along the at least a portion of the parametric curve such that when two linear segments are defined that connect the subdivision point to respective endpoints of the at least a portion of the parametric curve, a maximum chord error on each side of the subdivision point is equal,
    wherein the maximum chord error is a maximum distance between each of the two linear segments and respective points on two sub-portions of the at least a portion of the parametric curve between the respective endpoints and the subdivision point;
    storing data indicative of the subdivision point;
    determining whether the maximum chord error exceeds a pre-determined error tolerance; and
    in response to determining that the maximum chord error exceeds the pre-determined error tolerance:
        dividing the at least a portion of the parametric curve into the two sub-portions at the identified subdivision point; and
        repeating, for each of the two sub-portions, the identifying, the storing, and the determining.

2. The system of claim 1, wherein the pre-determined error tolerance is a default error tolerance.

3. The system of claim 1, wherein the pre-determined error tolerance is application-specific.

4. The system of claim 1, wherein the pre-determined error tolerance is user-configurable.

5. The system of claim 1, the operations further comprising:
    generating an alternate representation of the at least a portion of the parametric curve comprising two piecewise segments defined by the subdivision point and the respective endpoints; and
    storing data representing the alternate representation.

6. The system of claim 5, wherein the two piecewise segments comprise the two linear segments.

7. The system of claim 5, wherein the two piecewise segments comprise two curve segments.

8. The system of claim 1, wherein the identifying a subdivision point comprises:
    defining a set of simultaneous equations representing relationships between the subdivision point and respective points of maximum chord error on the at least a portion of the parametric curve on each side of the subdivision point; and
    solving the set of simultaneous equations using an iterative solver.

9. The system of claim 8, the operations further comprising:
    prior to solving the set of simultaneous equations, initializing variables representing the subdivision point and the respective points using values that are dependent on a midpoint of the at least a portion of the parametric curve.

10. The system of claim 1, wherein the one or more processors comprise one or more of a general-purpose central processing unit (CPU) and a graphics processing unit (GPU).

11. A non-transitory computer-readable storage medium having instructions stored thereon that, if executed by a processor, cause the processor perform operations comprising:
  accessing data representing at least a portion of a parametric curve;
  identifying a subdivision point along the at least a portion of the parametric curve such that when two linear segments are defined that connect the subdivision point to respective endpoints of the at least a portion of the parametric curve, a maximum chord error on each side of the subdivision point is equal,
  wherein the maximum chord error is a maximum distance between each of the two linear segments and respective points on two sub-portions of the at least a portion of the parametric curve between the respective endpoints and the subdivision point;
  storing data indicative of the subdivision point;
  determining whether the maximum chord error exceeds a pre-determined error tolerance; and
  in response to determining that the maximum chord error exceeds the pre-determined error tolerance:
    dividing the at least a portion of the parametric curve into the two sub-portions at the identified subdivision point; and
    repeating, for each of the two sub-portions, the identifying, the storing, and the determining.

12. The computer-readable medium of claim 11, wherein the pre-determined error tolerance is application-specific or user-configurable.

13. The computer-readable storage medium of claim 11, the operations further comprising:
  generating an alternate representation of the at least a portion of the parametric curve comprising two piecewise segments defined by the subdivision point and the respective endpoints; and
  storing data representing the alternate representation.

14. The computer-readable storage medium of claim 11, wherein the identifying a subdivision point comprises:
  defining a set of simultaneous equations representing relationships between the subdivision point and respective points of maximum chord error on the at least a portion of the parametric curve on each side of the subdivision point; and
  solving the set of simultaneous equations using an iterative solver.

15. A computer-implemented method, comprising:
  receiving, at a computing device, data representing at least a portion of a parametric curve;
  identifying, by the computing device, a subdivision point along the at least a portion of the parametric curve such that when two linear segments are defined that connect the subdivision point to respective endpoints of the at least a portion of the parametric curve, a maximum chord error on each side of the subdivision point is equal,
  wherein the maximum chord error is a maximum distance between each of the two linear segments and respective points on two sub-portions of the at least a portion of the parametric curve between the respective endpoints and the subdivision point;
  storing data indicative of the subdivision point;
  determining whether the maximum chord error exceeds a pre-determined error tolerance; and
  in response to determining that maximum chord error exceeds the pre-determined error tolerance:
    dividing the at least a portion of the parametric curve into the two sub-portions at the identified subdivision point; and
    repeating, for each of the two sub-portions, the identifying, the storing, and the determining.

16. The computer-implemented method of claim 15, wherein the pre-determined error tolerance is one or more of application-specific and user-configurable.

17. The computer-implemented method of claim 15, further comprising:
  generating, by the computing device, an alternate representation of the at least a portion of the parametric curve comprising two piecewise segments defined by the subdivision point and the respective endpoints; and
  storing, in a repository accessible by the computing device, data representing the alternate representation.

18. The computer-implemented method of claim 15, wherein the identifying a subdivision point comprises:
  defining a set of simultaneous equations representing relationships between the subdivision point and respective points of maximum chord error on the at least a portion of the parametric curve on each side of the subdivision point; and
  solving the set of simultaneous equations using an iterative solver module invoked by the computing device.

* * * * *